G. MANLOVE.
BRAKE LEVER MECHANISM FOR CARTS AND WAGONS.
APPLICATION FILED JULY 28, 1908.
944,801.
Patented Dec. 28, 1909.
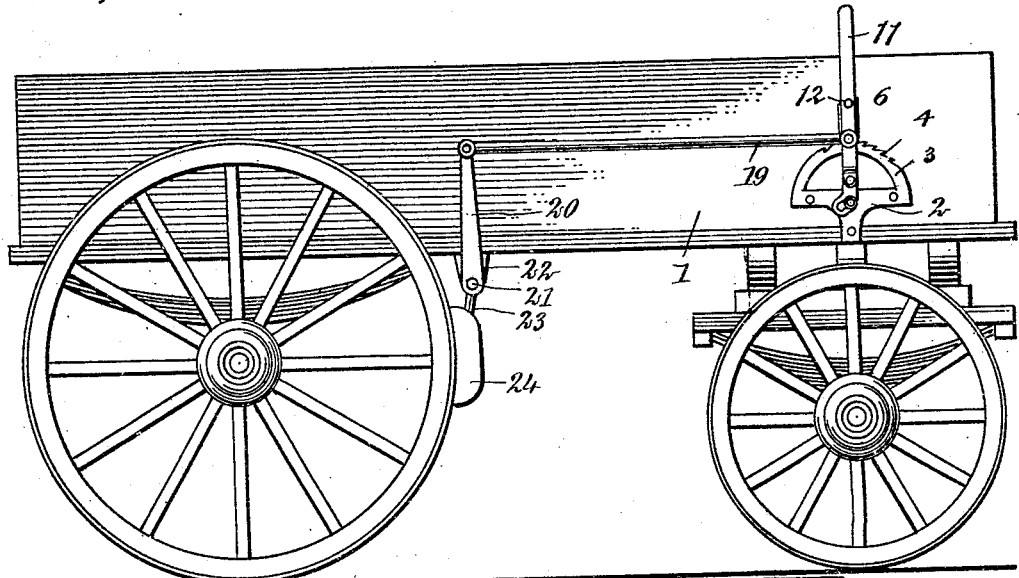
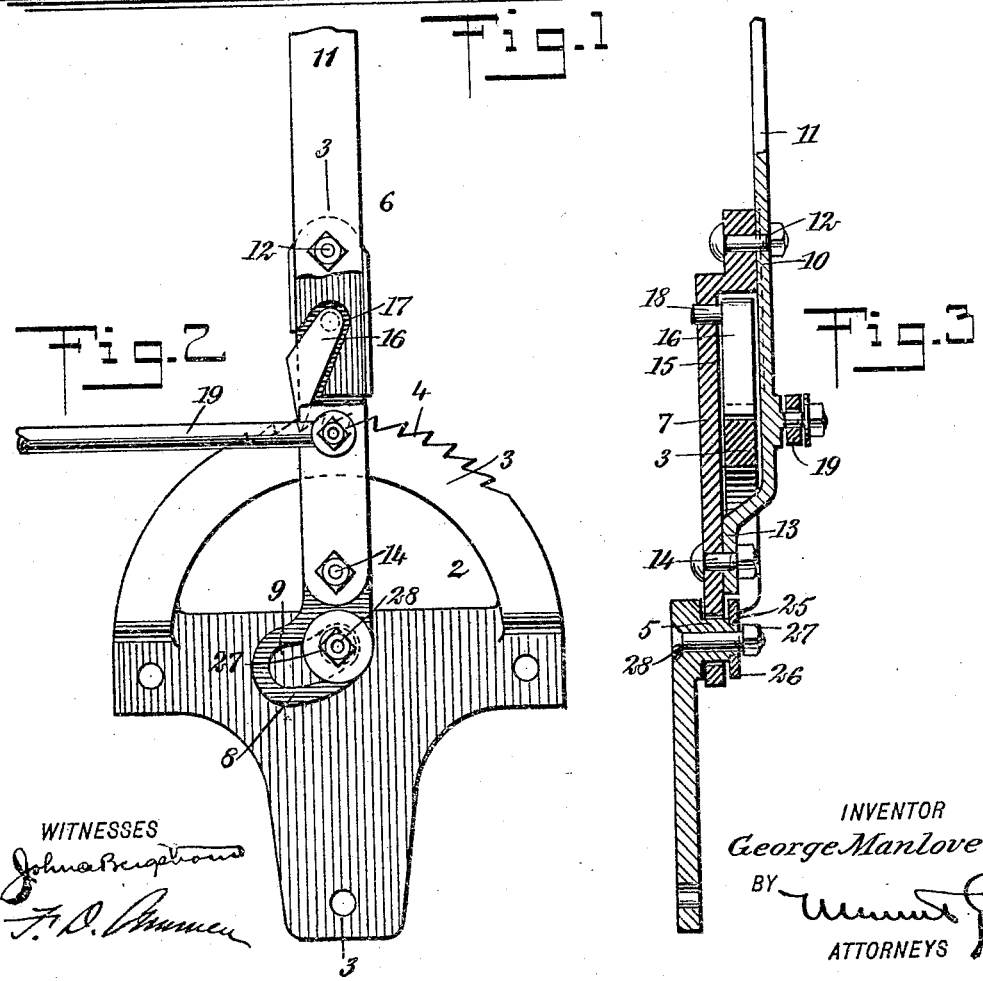
WITNESSES
INVENTOR
George Manlove
BY
ATTORNEYS

UNITED STATES PATENT OFFICE.

GEORGE MANLOVE, OF RUSHVILLE, ILLINOIS.

BRAKE-LEVER MECHANISM FOR CARTS AND WAGONS.

944,801.  Specification of Letters Patent.  Patented Dec. 28, 1909.

Application filed July 28, 1908. Serial No. 445,809.

*To all whom it may concern:*

Be it known that I, GEORGE MANLOVE, a citizen of the United States, and a resident of Rushville, in the county of Schuyler and State of Illinois, have invented a new and Improved Brake-Lever Mechanism for Carts and Wagons, of which the following is a full, clear, and exact description.

This invention relates to brake lever mechanisms for carts or wagons.

More particularly the invention concerns itself with that form of brake lever mechanism which comprises a segment with which a lever coöperates by means of a pawl, so that the pawl will hold the brakes applied when the lever is thrown over to the braking position.

The object of the invention is to produce a simple construction for releasing the pawl when it is desired to cease the application of the brakes. The arrangement is such that this is accomplished substantially automatically by a reverse movement of the lever itself.

While the invention is especially applicable in the connection suggested, it is thought to be generally useful in connection with controlling levers for mechanisms of different classes wherein the lever is locked against return by a pawl coöperating with a segment.

The invention consists in the construction and combination of parts to be more fully described hereinafter and particularly set forth in the claims.

Reference is to be had to the accompanying drawings forming a part of this specification in which similar characters of reference indicate corresponding parts in all the figures.

Figure 1 is a side elevation of a wagon to which the invention has been applied; Fig. 2 is a side elevation, upon an enlarged scale, of the lever segment, showing a portion of the lever broken away, and also showing a portion of the link which applies the brakes; and Fig. 3 is a vertical section on the line 3—3 of Fig. 2.

Referring more particularly to the parts, 1 represents a wagon of any common form, on the side of which a brake lever segment 2 is attached at a convenient point for the driver. This segment 2 comprises an arc 3 having inclined teeth 4 which project forwardly and present abrupt faces on their forward sides. At the center of the arc 3 a stud 5 is provided which is formed integrally with the body of the segment. Upon this stud the hand lever 6 of the brake mechanism is pivoted. This hand lever 6 is formed in two parts, the lower part or box 7 which is formed with a rearwardly projecting toe 8, having an inclined or curved slot 9 therein, as shown. This member 7 has an outwardly offset cheek or face 10 to which the body 11 of the lever is attached by a bolt 12. The lower part of the body 11 of the lever is offset inwardly so as to present a foot 13 which is attached by a bolt 14 to the lower end of the member 7. In this way the members 7 and 11 form a space 15 between them into which the point of a pawl 16 projects, the said pawl being received in a pocket 17 formed in the box 7, as shown most clearly in Fig. 2. Through this space 15 the arc 3 of the segment passes, as indicated. The pawl is pivoted on an integral pivot pin 18, and its point is adapted to engage with the teeth 4, as indicated in Fig. 2. A short distance below the level of the point of the pawl, a link 19 is pivotally attached, and this link extends rearwardly and attaches to the brake lever 20. This brake lever is attached to a brake shaft 21 mounted in a horizontal position in a bracket 22 under the body of the wagon, and rigid with this shaft 21, brake arms 23 are provided which carry shoes or brake blocks 24 which lie adjacent to the faces of the rear wheels, as shown.

Referring to Fig. 3, the extremity of the stud 5 is reduced so that an annular shoulder 25 is formed at this point, and on this shoulder rests a washer 26 which is held in position by a nut 27 on a bolt 28, which bolt is disposed centrally in the stud 5, as shown. From this arrangement the nut 27 may be tightened without clamping the lever against movement at the slot 9. Special attention is called to the fact that the slot 9 inclines downwardly toward the rear as viewed in Fig. 2, and also to the fact that the point of attachment of the link 19 must be between the point of the pawl and the stud 5. In other words, it must be below the level of the pawl. The reason for this will be presently explained.

The mode of operation of the brake lever mechanism will now be described: By forcing the handle or body 11 of the lever forwardly, the pawl will slide over the teeth 4 until the brakes are applied, and the pawl will then lock the lever against return. When the brakes are applied in this manner, the lever will have the position shown in Fig. 2, that is, the upper end of the slot 9 will engage the stud 5. This will be the position of equilibrium for the lever, for the reason that the force applied to the lever through the link 19 is between the point of the pawl and the stud. If the point of attachment of the link were above the pawl, it would evidently tend to rotate the lever about the point of the pawl so as to move the lower end of the lever toward the right. When it is desired to release the brakes, in other words, to disengage the pawl 16 from the segment, it is only necessary to pull the lever 6 rearwardly. In doing this the point of the pawl acts as a fulcrum and the upper edge of the inclined slot 9 rides up on the upper side of the stud 5 and raises the lever bodily in a substantially vertical direction; that is, it moves it upwardly or in a radial direction from the stud. This upward or outward movement of the lever is sufficient to disengage the pawl from the segment, and this releases the brakes.

Special attention is called to the fact that the slot 9 is very slightly inclined to the horizontal. When the brake is applied and the link 19 is under tension, the lower point 17ª of the pocket 17 is engaged by the rear edge of the pawl. When the lever is pulled rearwardly to release the brakes the pawl does not rotate on its pivot, but acts as though it were a rigid part of the lever. On account of the fact that the slot 9 is only slightly inclined to the horizontal, the upper edge of the slot rides up on the pivot bolt 28 and lifts the lever bodily in a vertical direction. This vertical movement disengages the pawl.

Having thus described my invention, I claim as new and desire to secure by Letters Patent,—

1. In a brake lever mechanism, in combination, a segment, a pivotally mounted lever adjacent to said segment, a pawl carried by said lever coöperating with said segment to lock said lever thereto, and means for limiting the rearwardly swinging movement of said pawl on said lever, said lever presenting an inclined edge near the pivot point thereof adapted to force said lever upwardly to disengage said pawl when said lever is moved toward the rear.

2. In a brake lever mechanism, in combination, a segment, a pivot bolt mounted on said segment, a lever having an inclined slot receiving said pivot bolt, a pawl carried by said lever engaging said segment, means for limiting the rearward swinging movement of said pawl on said lever, said slot being slightly inclined and affording means for raising said lever bodily on said pivot bolt when said lever is moved rearwardly, and a link attached to said lever between the point of attachment of said pawl and said pivot bolt.

In testimony whereof I have signed my name to this specification in the presence of two subscribing witnesses.

GEORGE MANLOVE.

Witnesses:
LENNA McCABE,
T. E. BOTTENBERG.